(12) United States Patent  
Bono et al.

(10) Patent No.: US 9,400,792 B1
(45) Date of Patent: Jul. 26, 2016

(54) FILE SYSTEM INLINE FINE GRAINED TIERING

(71) Applicant: EMC Corporation, Hopkinton, MA (US)

(72) Inventors: Jean-Pierre Bono, Westborough, MA (US); William C. Davenport, Burlington, MA (US); Miles A. de Forest, Bahama, NC (US); Philippe Armangau, Acton, MA (US); Michael Scheer, Summit, NJ (US); Morgan Clark, South Orange, NJ (US); Ahsan Rashid, Edison, NJ (US)

(73) Assignee: EMC Corporation, Hopkinton, MA (US)

( * ) Notice: Subject to any disclaimer, the term of this patent is extended or adjusted under 35 U.S.C. 154(b) by 308 days.

(21) Appl. No.: 13/928,591

(22) Filed: Jun. 27, 2013

(51) Int. Cl.
*G06F 17/30* (2006.01)
*G06F 3/06* (2006.01)
*G06F 9/50* (2006.01)

(52) U.S. Cl.
CPC ........ *G06F 17/30082* (2013.01); *G06F 3/0604* (2013.01); *G06F 9/5016* (2013.01)

(58) Field of Classification Search
CPC  G06F 17/30082; G06F 3/0604; G06F 9/5016
USPC ........................................................ 707/822
See application file for complete search history.

(56) References Cited

U.S. PATENT DOCUMENTS

| | | | | |
|---|---|---|---|---|
| 6,466,978 | B1* | 10/2002 | Mukherjee | .............. G06F 3/061 348/E5.008 |
| 6,785,794 | B2* | 8/2004 | Chase | .................. G06F 3/0601 710/18 |
| 7,254,685 | B1 | 8/2007 | Cardente | |
| 7,472,141 | B1* | 12/2008 | Shah | ................... G06F 11/1435 |
| 7,631,155 | B1* | 12/2009 | Bono et al. | ..................... 711/156 |

(Continued)

OTHER PUBLICATIONS

Piernas et al., "The Design of New Journaling File Systems: The DualFS Case", IEEE Transactions on Computer, vol. 56, No. 2, Feb. 2007, pp. 267-281.*

(Continued)

*Primary Examiner* — Phuong Thao Cao
(74) *Attorney, Agent, or Firm* — BainwoodHuang (57) ABSTRACT

A technique for managing storage tiering in a data storage apparatus operates at a fine level of granularity in response to write requests as blocks are allocated for writing. As write requests arrive or are otherwise processed by the data storage apparatus, the data storage apparatus identifies a quality of service to be provided for satisfying each write request and allocates a set of blocks from storage devices of storage tiers that provide the identified quality of service. The data storage apparatus may then store the information specified in the write request in the newly allocated blocks.

21 Claims, 5 Drawing Sheets

(56) References Cited

U.S. PATENT DOCUMENTS

| | | | |
|---|---|---|---|
| 7,636,801 B1* | 12/2009 | Kekre | H04L 67/1097 709/218 |
| 7,711,789 B1* | 5/2010 | Jnagal et al. | 709/213 |
| 7,849,263 B1 | 12/2010 | French | |
| 7,873,619 B1* | 1/2011 | Faibish | G06F 17/30091 707/705 |
| 8,285,758 B1 | 10/2012 | Bono et al. | |
| 8,429,307 B1 | 4/2013 | Faibish et al. | |
| 8,433,869 B1 | 4/2013 | Natanzon et al. | |
| 8,566,371 B1 | 10/2013 | Bono et al. | |
| 8,584,128 B1* | 11/2013 | Don | G06F 9/5011 718/100 |
| 8,621,178 B1* | 12/2013 | Lazar | G06F 12/0223 711/117 |
| 8,645,654 B1 | 2/2014 | Bailey et al. | |
| 8,782,324 B1 | 7/2014 | Chen et al. | |
| 9,122,697 B1* | 9/2015 | Bono | G06F 17/30091 |
| 9,286,007 B1* | 3/2016 | Bono | G06F 3/0689 |
| 9,304,999 B1* | 4/2016 | Bono | G06F 17/30091 |
| 2002/0103885 A1* | 8/2002 | Hamada | 709/219 |
| 2003/0097443 A1* | 5/2003 | Gillett | H04L 29/06 709/225 |
| 2003/0217245 A1* | 11/2003 | Chase | G06F 3/0601 711/170 |
| 2004/0030668 A1 | 2/2004 | Pawlowski et al. | |
| 2006/0010154 A1* | 1/2006 | Prahlad | G06F 17/30197 |
| 2006/0064697 A1* | 3/2006 | Kagi et al. | 718/103 |
| 2006/0112155 A1* | 5/2006 | Earl | G06F 17/30067 |
| 2007/0083482 A1* | 4/2007 | Rathi | G06F 3/048 |
| 2008/0183963 A1* | 7/2008 | He | G06F 11/1092 711/114 |
| 2009/0112789 A1* | 4/2009 | Oliveira | H04L 67/1095 |
| 2009/0177721 A1* | 7/2009 | Mimatsu | 707/205 |
| 2009/0239468 A1* | 9/2009 | He et al. | 455/41.2 |
| 2009/0240784 A1* | 9/2009 | Soltis | G06F 3/0605 709/217 |
| 2009/0307396 A1* | 12/2009 | Nogueras | G06F 9/541 710/65 |
| 2010/0077101 A1* | 3/2010 | Wang et al. | 709/238 |
| 2010/0293147 A1* | 11/2010 | Snow | G06F 17/30067 707/640 |
| 2011/0119413 A1* | 5/2011 | Gulati et al. | 710/39 |
| 2011/0161675 A1* | 6/2011 | Diard | G06F 21/6281 713/189 |
| 2011/0162077 A1* | 6/2011 | Kadam | G06F 12/1425 726/26 |
| 2012/0131469 A1* | 5/2012 | Yamuna | G06F 9/54 715/736 |
| 2012/0173778 A1* | 7/2012 | Povaliaev | G06F 3/0659 710/68 |
| 2013/0054888 A1* | 2/2013 | Bhat et al. | 711/114 |
| 2013/0054932 A1* | 2/2013 | Acharya et al. | 711/202 |
| 2013/0074087 A1* | 3/2013 | Chambliss et al. | 718/103 |
| 2013/0117286 A1* | 5/2013 | Gallant | G06F 7/24 707/752 |
| 2013/0117515 A1* | 5/2013 | Ashmore | G06F 12/16 711/162 |
| 2013/0179481 A1* | 7/2013 | Halevy | G06F 17/30224 707/827 |
| 2013/0268738 A1* | 10/2013 | Zhang | G06F 3/0619 711/162 |
| 2014/0052706 A1* | 2/2014 | Misra | G06F 17/30073 707/698 |
| 2014/0156965 A1* | 6/2014 | Yang | G06F 12/0253 711/172 |
| 2014/0181455 A1* | 6/2014 | Wang | G06F 3/0608 711/171 |
| 2014/0207928 A1* | 7/2014 | Mesnier | H04L 41/507 709/223 |
| 2014/0281131 A1* | 9/2014 | Joshi | G06F 12/0804 711/103 |
| 2014/0282514 A1* | 9/2014 | Carson | G06F 9/45533 718/1 |
| 2014/0297941 A1* | 10/2014 | Rajani | G06F 3/0644 711/114 |
| 2014/0310434 A1* | 10/2014 | Strange | G06F 3/0653 710/16 |
| 2014/0310455 A1* | 10/2014 | Baldwin | G06F 3/0641 711/114 |

OTHER PUBLICATIONS

Le et al., "A Cost-Effective Distributed File Service with QoS Guarantees", In Proceedings of Middleware, Nov. 2007, 20 pages.*

Franciosi et al., "Data Allocation Strategies for the Management of Quality of Service in Virtualized Storage Systems", In Proceedings of the 2011 IEEE 27th Symposium on Mass Storage Systems and Technologies (MSST '11), IEEE Computer Society, Washington, DC, USA, 2011, pp. 1-6.*

Shenoy et al., "Symphony: An Integrated Multimedia File System", Technical Report, 1998, 15 pages.*

Sipek et al., "Kernel Support for Stackable File Systems", In Proceedings of the Linux Symposium, vol. Two, pp. 223-228, 2007.*

Wu et al., "Providing Quality of Service Support in Object-Based File System", In Proceedings of the 24th IEEE/14th NASA Goddard Conference on Mass Storage Systems and Technologies, Sep. 2007, 12 pages.*

Bono, "Unified Datapath Architecture," U.S. Appl. No. 13/828,322, filed Mar. 14, 2013.

Bono, et al., "Managing Host Data Placed in a Container File System on a Data Storage Array Having Multiple Storage Tiers," U.S. Appl. No. 13/929,019, filed Jun. 28, 2013.

Bono, et al., "Persistent Metadata Cache," U.S. Appl. No. 14/576,931, filed Dec. 19, 2014.

Bono, et al., "Preserving Quality of Service When Replicating Data Objects," U.S. Appl. No. 14/576,939, filed Dec. 19, 2014.

* cited by examiner

FILE SYSTEM INLINE FINE GRAINED TIERING

BACKGROUND

Data storage systems are arrangements of hardware and software that may include multiple storage processors coupled to arrays of non-volatile storage devices. In typical operation, the storage processors service storage requests that arrive from users. The storage requests specify files or other data elements to be written, read, created, or deleted, for example. The storage processors may each run software that manages incoming storage requests and performs various data processing tasks to organize and secure user data stored on the non-volatile storage devices.

The non-volatile storage devices are often provided in a variety of types, such as magnetic disk drives, flash drives, and/or solid state drives (SSDs), for example. Different device types provide different qualities of service. Quality of service is based on multiple factors, but a chief factor is access speed. Thus, flash drives are generally regarded as providing higher quality of service than magnetic disk drives because flash drives can be accessed much more quickly than magnetic disk drives. Storage devices providing different qualities of service may be arranged in different storage tiers, where a "storage tier" provides a particular quality of service. Thus, a data storage system may provide multiple storage tiers, such as Tier 1 storage for flash drives, Tier 2 storage for SSDs, and Tier 3 storage for magnetic disk drives, for example.

Some data storage systems monitor the activity of different host data objects, such as LUNs, i.e., logical storage volumes. If a LUN hosted by the data storage system becomes heavily accessed, e.g., if the LUN receives many requests to read and write data, the data storage system may promote the LUN to a higher storage tier, such as from magnetic disk to flash, which is better suited for handling the heavy load. Conversely, if host access to the LUN later diminishes, the data storage system may demote the LUN to a lower storage tier, e.g., back to magnetic disk, and make the higher tier devices available for use elsewhere. In this manner, the data storage system makes efficient use of its resources, applying the fastest storage to the host data objects that are in the highest demand.

SUMMARY

Unfortunately, conventional approaches to managing the tiering of storage resources in data storage systems operate at course levels of granularity. For example, some tiering schemes operate at the level of the data object as a whole, such that they promote or demote storage for an entire LUN at a time, for example, but not for particular parts of a LUN. Other tiering schemes use background processes that monitor the activity of storage slices. As is known, a "slice" is a unit of storage that can be provisioned to a data object from an underlying set of like-kind storage devices. According to these tiering schemes, when a slice becomes "hot" (heavily accessed), the slice may be promoted to a higher tier of storage, meaning that the contents of the slice are moved to a slice provisioned from higher-tier devices. Still, slices are themselves provisioned at course levels of granularity, with typical slices being in the range of 1 GB or 256 MB, for example. By contrast, the smallest unit of allocatable storage in a data storage system is typically a "block," the size of which varies from system to system, but for which a typical size is 8 KB.

In contrast with these prior approaches, an improved technique for managing storage tiering in a data storage apparatus is conducted at fine level granularity in response to write requests as blocks are allocated for writing. As write requests arrive or are otherwise processed by the data storage apparatus, the data storage apparatus identifies a quality of service to be provided for satisfying each write request and proceeds to allocate a set of blocks from devices of storage tiers that provide the indicated quality of service. The data storage apparatus may then store the information specified in the write request in the allocated space.

Storage tiering may thus be performed inline, i.e., in the context of executing write requests, and at the same level of granularity as block allocation. For example, if the set of blocks allocated for storing information specified in a write request consists of only a single block, then the data storage apparatus allocates only a single block of storage to satisfy the write request and conducts storage tiering at the granularity level of a single block.

The improved technique may be applied both when the information specified in the write request includes data (e.g., the contents of a file) and when the set of information includes metadata (e.g., inodes, indirect blocks, etc.). The improved technique thus supports allocation of blocks from different storage tiers for data and metadata, as well as for different kinds of metadata.

In some examples, the data storage apparatus has a tiering policy that specifies different qualities of service to be provided for different types of information and or circumstances. When the data storage apparatus receives a write request, the data storage apparatus checks the information specified in the write request to determine its type (e.g., whether it is data or metadata, if metadata, what kind of metadata, what type of object the set of information refers to, time of day, access patterns, ownership, etc.). The data storage apparatus may then access the tiering policy to identify a quality of service specified therein for the type of information received in the write request and/or the circumstances surrounding the request. The data storage apparatus then allocates blocks from a storage tier that meets the indicated quality of service to satisfy the write request.

In some examples, the data storage apparatus stores quality of service information in the data objects themselves. For example, where the data storage apparatus hosts a file system, the data storage apparatus may store a quality of service indicator for each file of the file system, or for some subset of files. For example, the data storage system may provide an inode for each file of the file system. In an example, each inode is made to include a field that indicates a quality of service. When the data storage apparatus receives a request to write to a file of the file system, the data storage apparatus checks the file's inode, identifies the quality of service indicated in the field of the inode, and proceeds to allocate blocks from a storage tier that meets the indicated quality of service to satisfy the write request for the file.

The improved technique may also operate on portions of a file, rather than on an entire file or other data object. For example, the inode of a file may include a number of direct pointers pointing to blocks storing file data. Each direct pointer specifies a particular range of the file. In accordance with example improvements hereof, any of the direct pointers in the file's inode may include a quality of service field that indicates a quality of service to be applied for the data block pointed to by the direct pointer. Also, the inode of a file may point to a number of indirect blocks. Each such indirect block points to a range of blocks for storing data of the file (e.g., directly or through other indirect blocks and/or other structures). In an example, any such indirect block may be made to include a field that indicates a quality of service to be used when storing data pointed to by the indirect block. Quality of service may be specified at even finer levels of granularity. For example, designated ranges of block pointers, or even individual block pointers, within an indirect block may be provided with a respective quality of service field, allowing the specification of quality of service via indirect blocks down to the individual block level. When the data storage apparatus receives a request to write to the file in a range covered by a particular indirect block, the data storage apparatus identifies one or more the quality of service values indicated by any fields of the indirect block and proceeds to allocate blocks from one or more storage tiers that meet the indicated quality of service value(s) to satisfy the write request for the range of the file. Thus, allocation of ranges of blocks within a file, rather than all blocks of the file, may be effected through the use of quality of service indicators provided in indirect blocks.

Without limiting the generality of the foregoing, certain embodiments are directed to a method of storing data in different storage tiers of a data storage apparatus. The method includes receiving, via an IO stack of a storage processor of the data storage apparatus, a request to write a set of information in the data storage apparatus, obtaining, in response to receiving the request via the IO stack, a data element designating a quality of service to be provided for storing the set of information, and allocating a set of blocks from one or more storage devices of a storage tier that provides the quality of service designated in the data element read in response to receiving the request.

Other embodiments are directed to a data storage apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing storage tiering in a data storage apparatus is conducted at fine level granularity in response to write requests as blocks are allocated for writing. As write requests arrive or are otherwise processed by the data storage apparatus, the data storage apparatus identifies a quality of service to be used for satisfying each write request and proceeds to allocate a set of blocks from devices of a storage tier that provide the identified quality of service. The data storage apparatus may then store information specified in the write request in the allocated blocks.

Figure 1:
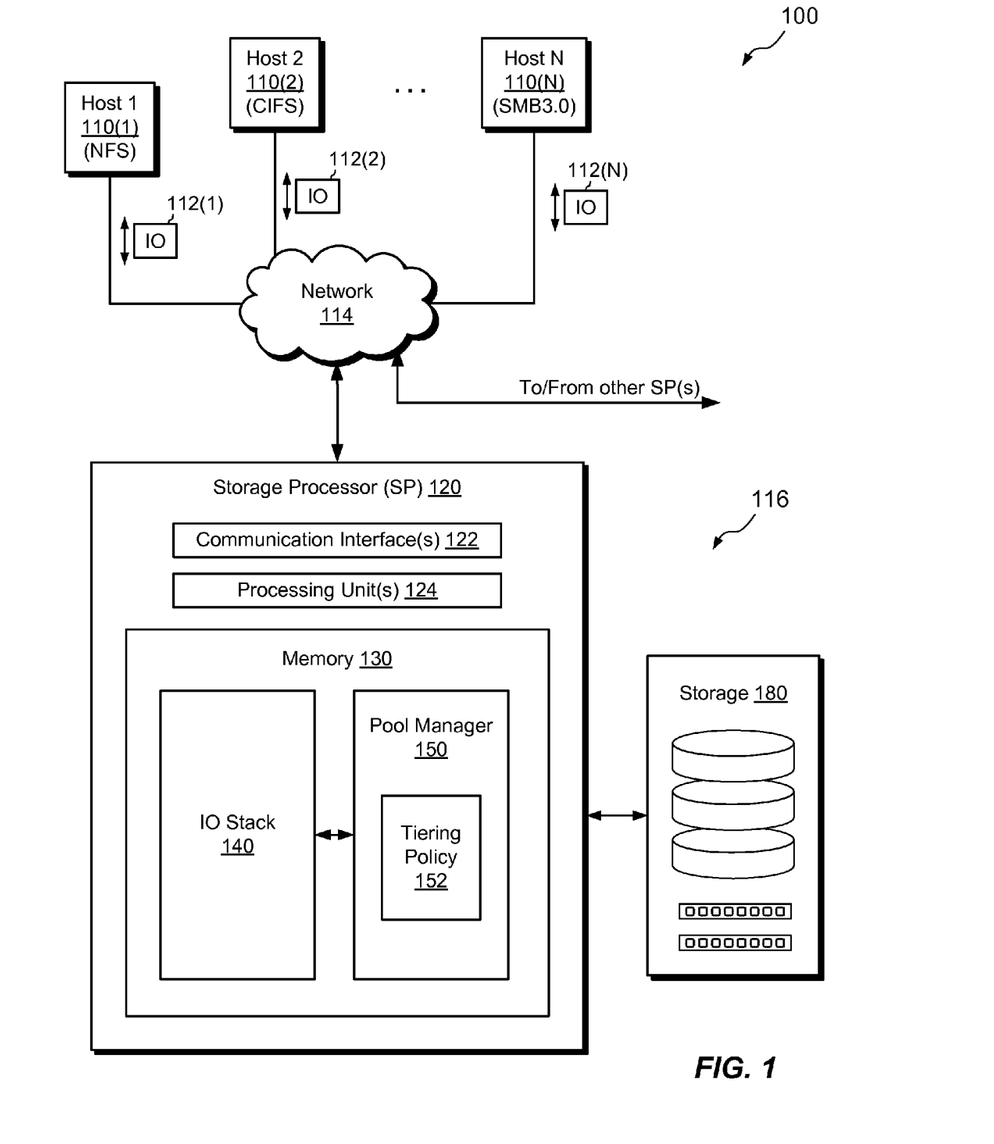
FIG. 1 is a block diagram of an example environment in which the improved techniques hereof can be practiced.

FIG. 1 shows an example environment 100 in which embodiments of the improved technique hereof can be practiced. Here, multiple host computing devices ("hosts") 110(1) through 110(N) access a data storage apparatus 116 over a network 114. The data storage apparatus 116 includes a storage processor, or "SP," 120 and a set of storage devices 180. The set of storage devices 180 include, for example, hard disk drives, electronic flash drives, solid state drives, and/or other types of storage devices. Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of communicating with hosts 110(1-N).

The network 114 can be any type of network or combination of networks, such as a storage area network (SAN), local area network (LAN), wide area network (WAN), the Internet, and/or some other type of network or combination of networks. The hosts 110(1-N) connect to the SP 120 using various technologies, such as NFS (Network File System), SMB 3.0 (Server Message Block), CIFS (Common Internet File System), Fibre Channel, and/or iSCSI, for example. Any number of hosts 110(1-N) may be provided, using any of the above protocols, some subset thereof, or other protocols besides those shown. As is known, NFS, SMB 3.0, and CIFS are file-based protocols, whereas Fibre Channel and iSCSI are block-based protocols. The SP 120 is configured to receive requests 112(1-N) according to these protocols and to respond to such requests 112(1-N). For example, the SP 120 may respond to file-based requests by creating and deleting file systems, mounting and dismounting file systems, creating and deleting files and directories, and/or reading and writing files and directories, as maintained in the set of storage devices 180. Also, the SP 120 may respond to block-based requests by creating, deleting, establishing settings on, reading from, and/or writing to LUNs and/or other block-based data objects.

The SP 120 is seen to include one or more communication interfaces 122, a set of processing units 124, and memory 130. The communication interfaces 122 include, for example, network interface adapters, and SCSI adapters, for converting electronic and/or optical signals received from the network 114 to electronic form for use by the SP 120. The set of processing units 124 includes one or more processing chips and/or assemblies. In a particular example, the set of processing units 124 includes multiple CPU cores. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are made to carry out the operations of the software constructs. Although certain software constructs are specifically shown and described, it is understood that the memory 130 typically includes many other software constructs, which are not shown, such as an operating system, various applications, processes, and daemons.

As shown in FIG. 1, the memory 130 includes an IO stack 140 and a pool manager 150. The pool manager 150 includes a tiering policy 152. The IO stack 140 operates in response to requests 112(1-N) to carry out commands for reading and writing block-based objects and/or file-based objects stored in the set of storage devices 180. The IO stack 140 may operate in coordination with a file system manager (not shown) for performing file-based operations on file systems as requests are being processed. The pool manager 150 performs many functions, such as managing the provisioning of storage units (e.g., slices) to data objects hosted by the data storage apparatus 116, allocating particular blocks of storage to such data objects, and freeing blocks when they are no longer being used by data objects.

The tiering policy 152 associates different types of information and/or circumstances with respective qualities of service. For example, the tiering policy 152 may specify quality of service for file system metadata and another quality of service for file system data. In some examples, the tiering policy 152 is implemented as a file, such as a database file, which may be stored on the SP 120 or in the storage 180. In some examples, the tiering policy 152 includes an executable component to actively compute quality of service from various factors.

The tiering policy 152 may be arbitrarily complex. For example, the tiering policy 152 may specify different qualities of service for different types of metadata, such as one quality of service for inodes and another quality of service for indirect blocks. Also, the tiering policy 152 may specify different qualities of service for different types of file data, e.g., according to the nature of the data stored. For example, a file may be used to store a VHD (virtual hard disk), VMDK (virtual memory disk), or some similar structure. The tiering policy 152 may specify particular qualities of service for file data of these file types. Also, the tiering policy 152 may specify different qualities of service for different ranges of files. For example, a large database file may include heavily accessed data ranges, and the tiering policy 152 may assign those data ranges to a higher quality of service than it assigns to lightly accessed data ranges of the same file. Different qualities of service may similarly be specified for different ranges of VHDs and VMDKs. Further, the tiering policy 152 may specify different qualities of service for different times of day, for different access patterns by the hosts 110(1-N), based on ownership of a data object, and/or based on other circumstances. In some examples, the tiering policy 152 is established in advance of receiving requests 112(1-N) from hosts and may be updated on a regular basis and/or as needed. In other examples, the tiering policy 152 may be updated effectively in real time, e.g., in response to use patterns and/or other factors affecting the data storage apparatus 116.

The data storage apparatus 116 associates quality of service levels with particular storage tiers. Indeed, a particular quality of service may imply a particular storage tier of the data storage apparatus 116. Quality of service may be indicated in levels, for example, such as "low," "medium," or "high," or as numbers, for example. Such levels or numbers may also be used to describe the different storage tiers provided by the data storage apparatus 116. In an example, the tiering policy 152 operates without any information about the types of storage devices in the storage 180 and thus without information about particular storage tiers available in the data storage apparatus 116. The qualities of service may thus be regarded as requested qualities of service rather than required qualities of service. In some examples, the data storage apparatus 116 may not have any available storage that aligns with a requested quality of service, and the actual storage tier used to satisfy a write request may provide a different quality of service from the one requested.

In operation, and by way of example, the data storage apparatus 116 receives a write request (e.g., one of requests 112(1-N)) over the network 114 from a host (e.g., one of the hosts 110(1-N)) to perform a write operation on the data storage apparatus 116. The storage processor 120 receives the request via the communication interface(s) 122 and proceeds to process the request via the IO stack 140.

In some examples, the write request includes a data element that specifies a requested quality of service. If the pool manager 150 has already provisioned and allocated enough blocks derived from devices of the storage 180 that provide the requested quality of service, the IO stack 140 simply stores the information (generally, data or metadata) in the already-allocated blocks. However, if no blocks of the requested quality of service have been allocated, or if too few have been allocated to satisfy the write request, then the IO stack 140 directs the pool manager 150 to allocate new blocks from devices of the storage 180 from a storage tier that meet the requested quality of service. The IO stack 140 then proceeds to store the information specified in the write request in the newly allocated blocks (and in the previously allocated blocks, if some were already available).

In other examples, the write request does not arrive at the data storage apparatus 116 specifying any quality of service. In such examples, various techniques may be applied to assign a quality of service for the write request. In one example, the IO stack 140 accesses the tiering policy 152 and identifies a quality of service specified by the tiering policy 152 for the information to be written and for the current circumstances, e.g., in accordance with all the various considerations described above for the tiering policy 152. The IO stack 140 provides the obtained quality of service as a data element to be used in further processing. The IO stack 140 then processes the write request as described above, allocating data blocks from devices of a storage tier that meets the quality of service designated by the data element as needed to satisfy the write request.

In another example, a requested quality of service for satisfying the write request is obtained from metadata in the file system itself, rather than from the tiering policy 152. For example, inodes, indirect blocks, and/or other metadata structures are made to include respective fields that store respective qualities of service. In processing the write request, the IO stack 140 identifies the file specified by the write request and reads a field of its inode, a field of any affected indirect blocks, and/or a field of other metadata, to obtain a data element indicating the requested quality of service. The IO stack 140 then continues processing the write request as described above.

Figure 2:
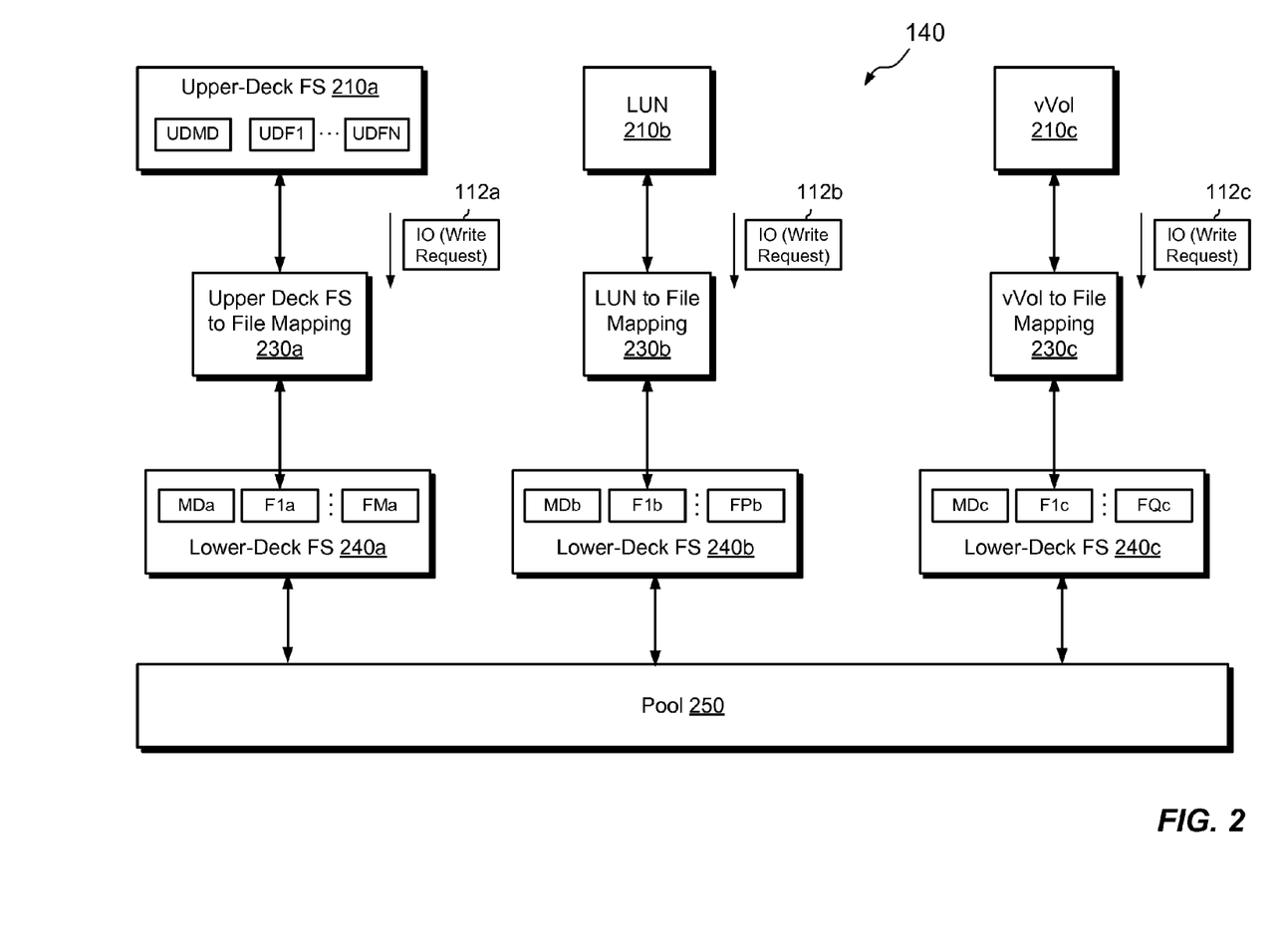
FIG. 2 is a block diagram showing different host data objects mapped to respective files of lower-deck file systems.

FIG. 2 shows an example stack-up of structures of the IO stack 140. Various data objects are shown, including an upper-deck file system 210a, a LUN 210b and a vVol 210c. As is known, vVols are virtual disks associated with virtual machines and maybe provided in the form of block-accessible or file-accessible objects. The IO stack 140 may operate on any number of data objects, like the data objects 210a-c, of any types, in any combination, and may include other types of data objects besides those shown. In some examples, the data storage apparatus 116 stores only one type of data object (e.g., only upper-deck file systems), and may provide many data objects of that type.

In an example, the upper-deck file system 210a is a host file system, i.e., a file system accessible to one or more of the hosts 110(1-N) for storing and retrieving host data files. Alternatively, the upper-deck file system 210 may be used internally by the data storage apparatus and may be inaccessible to hosts. The upper-deck file system 210a is seen to include upper-deck metadata (UDMD), and upper-deck files (UDF1-UDFN). The upper-deck metadata UDMD relates to the upper-deck files UDF1-UDFN, in that the upper-deck metadata includes inodes, indirect blocks, and so forth, which describe the upper-deck files and point to their respective data blocks as represented in the upper-deck file system 210a.

Mappings 230a-230c map the data objects 210a-c to respective files F1a-F1c of respective lower-deck file systems 240a-240c. Each of the lower-deck files F1a-c internally provides a representation of a complete data object. Thus, file F1a provides a representation of the complete upper-deck file system 210a. Similarly, file F1b provides a representation of the complete LUN 210b, and file F1c stores a representation of the complete vVol 210c. Each of the lower-deck file systems 240a-c obtains storage resources (e.g., slices) from a pool 250. For example, slices may be provisioned from the pool 250 (by the pool manager 150) to any of the lower-deck file systems 240a-c, and may be returned to the pool 250 if they are no longer used. In other implementations, multiple pools 250 are provided, e.g. one for each of the lower-deck file systems 240a-c, or one for some group of lower-deck file systems.

As shown, each of the lower-deck file systems 240a-c itself provides one or more files, as well as metadata (e.g., inodes, indirect blocks, etc.) that describe the files of the respective lower-deck file system and point to their respective data blocks. For example, lower-deck file system 240a includes metadata MDa, which describe and point to the blocks files F1a-FMa. The files of the lower-deck file system 240, other than the file F1a, may provide any type of data, but typically provide snaps (e.g., point in time copies) of the file F1a. Because the file F1a provides the complete upper-deck file system 210a, snaps of the file F1a provide snaps of the upper-deck file system 210a at different points in time.

The lower-deck file systems 240b and 240c are similarly constructed. For example, lower deck file system 240b includes metadata MDb, which describe and point to P different files F1b-FPb, which themselves provide file representations of the LUN 210b and snaps of the LUN 210b. Also, lower deck file system 240c includes metadata MDc, which describe and point to Q different files F1c-FQc, which themselves provide file representations of the vVol 210c and snaps of the vVol 210c.

It is understood that the upper-deck file systems 210a-c, the lower deck file systems 240a-c, and the pool 250 are logical constructs, and that the actual storage that supports these constructs resides in the storage devices of the storage 180. Such storage devices may be assigned to different storage tiers.

In operation, the IO stack 140 receives and processes requests 112a-c. The requests 112a-c are versions of various requests 112(1-N) received from hosts 110(1-N). Each of the requests 112a-c is a write request for writing a respective set of information in the data storage apparatus 116. For example, the request 112a is a request to write a set of information (e.g., a file, portion thereof, or metadata) to the upper-deck file system 210a. Similarly, the request 112b is a request to write a set of information (e.g., block-based data) to the LUN 210b. Also, the request 112c is a request to write a set of information (e.g., block-based data or file-based data) to the vVol 210c. It is understood that the requests 112a-c may be processed at different times or simultaneously (e.g., by different threads running on the SP 120). The requests 112a-c each propagate down the IO stack 140, through the respective mappings 230a-c, and to the respective lower-deck file systems 240a-c.

In the case of the request 112a, and in some examples, the upper-deck file system 210a may acquire a requested quality of service, e.g., via the tiering policy 152 or via fields in the upper-deck metadata UDMD, as described above. The upper-deck file system 210a may then indicate the requested quality of service in a data element. The write request 112a propagates down the IO stack 140 to the lower-deck file system 240a. The lower-deck file system 240a obtains the requested quality of service from the data element and stores the set of information specified in the request 112a in blocks allocated from a tier of devices that provides the requested quality of service. If no such blocks are already allocated, the IO stack 140 communicates with the pool manager 150 to allocate blocks from a tier of devices of the storage 180 that provides the requested quality of service.

In the cases of the LUN 210b and the vVol 210c and in some examples, the requests 112b and 112c may each already include a quality of service designator, which may have been applied by respective hosts. Such quality of service designators provide data elements, which are obtained by the respective lower-deck file systems 240b and 240c and applied to store the respective sets of information specified by the requests 112b and 112c in blocks allocated from devices of the storage 180 that meet the quality of service designated for each request. In each case, blocks may be allocated that meet the quality of service, if the number of already-allocated blocks is insufficient to accommodate the write request.

In other examples, the requests 112b and/or 112c arrive without any quality of service designators, and the IO stack 140 accesses the tiering policy 152 upon receiving each request. The IO stack 140 identifies a storage tier that the tiering policy 152 specifies for the particular data object, range of the data object, and/or other circumstances. For each of the requests 112a and 112b, the IO stack 140 provides a data element that designates the requested storage tier. The IO stack 140 then processes the each request at the respective lower-deck file system 240b or 240c and stores each respective set of information in blocks allocated from devices of the storage 180 that meet the quality of service designated in the respective data element.

In still other examples, the requests 112b and/or 112c arrive without quality of service designators, and the IO stack 140 obtains quality of service designators from metadata stored in the respective lower-deck file systems 240b and 240c (i.e., MDb and MDc). In an example, the metadata include fields, e.g., within any of inodes and/or indirect blocks, which designate a requested quality of service. In each case, the lower-deck file system 240b or 240c reads the field (data element) and applies the quality of service designated therein when storing the set of information.

Figure 3:
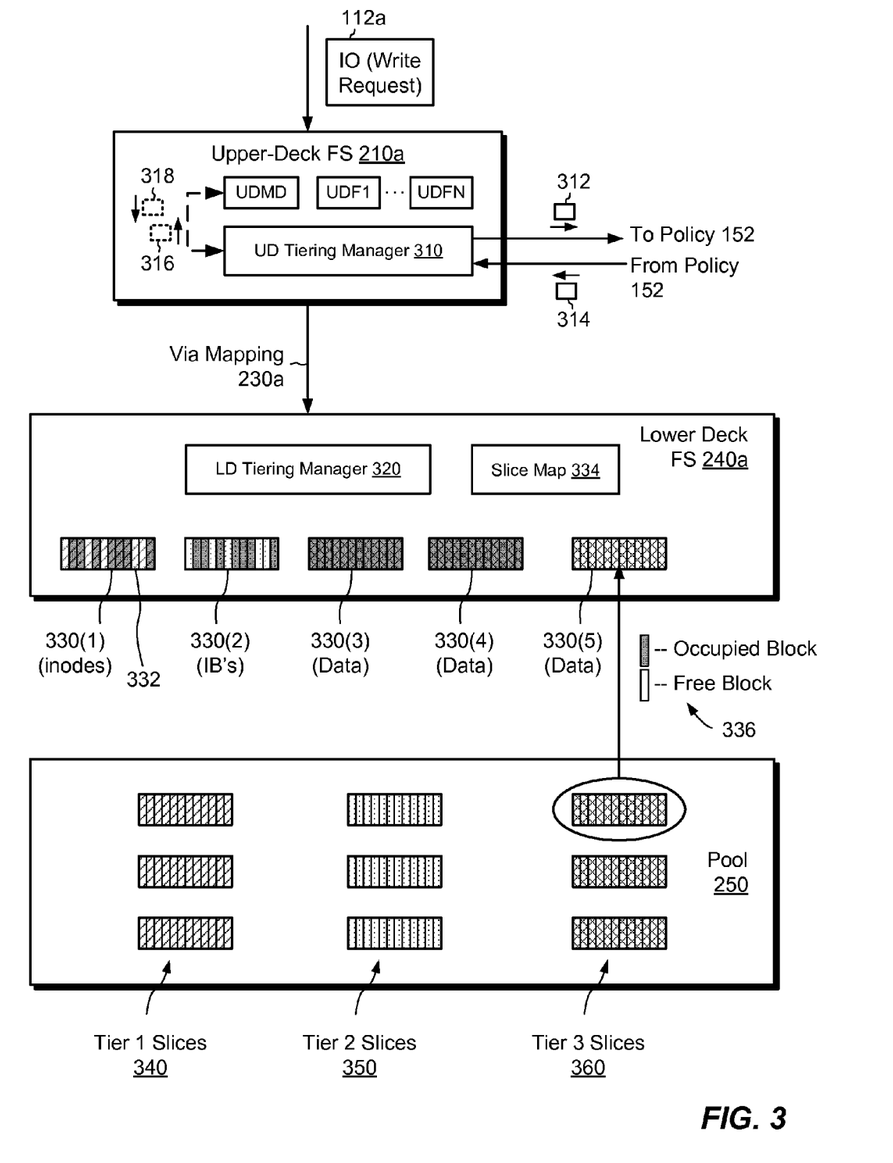
FIG. 3 is a block diagram showing an example arrangement of an upper-deck file system and a lower-deck file system, wherein a quality of service for satisfying a write request is acquired at the upper deck and applied at the lower deck.

FIG. 3 shows a more detailed view of an example stack-up of structures of the IO stack 140 for processing the write request 112a via the upper-deck file system 210a, the lower-deck file system 240a, and the pool 250. Here, it is seen that the upper-deck file system 210a includes, in addition to the structures already described, an upper-deck tiering manager 310. Similarly, the lower-deck file system 240a is seen to include a lower-deck tiering manager 320 as well as a data structure, such as a slice map 334. The slice map 334 stores information about slices (e.g., slices 330(1-4)) provisioned to the lower-deck file system 240a, and includes, for each slice, for example, the storage tier of the slice and a count of free blocks in the respective slice.

The slices 330(1) through 330(4) support the metadata MDa and files F1a-F1m of the lower-deck file system 240a, as in FIG. 2. Each of the slices 330(1-4) has been provisioned from the pool 250 to the lower-deck file system 240a. As indicated by the legend 336, blocks of each of the slices 330(1-4) are either occupied or free. Also, different ones of the slices 330(1-4) may store, exclusively in some examples, file data or certain types of metadata. For example, slice 330(1) stores inodes, whereas slice 330(2) stores indirect blocks. In other examples, inodes and indirect blocks are stored together on the same slice or slices. Slices 330(3) and 330(4) store data, e.g., the contents of files F1a-F1m of the lower-deck file system 240a. As indicated by the different hatching patterns on the slices 330(1-4), the slices 330(1-4) are derived from storage devices providing different qualities of service, i.e., devices of different storage tiers.

The pool 250 is seen to include many slices. As indicated by the different hatching patterns, the slices shown in the pool 250 are derived from different types of storage devices providing different qualities of service. For example, the pool 250 includes Tier 1 slices 340 (e.g., derived from flash drives), Tier 2 slices (e.g., derived from solid state drives), and Tier 3 slices 360 (e.g., derived from magnetic disk drives). The pool 250 may also include slices of other tiers derived from other types of storage devices, or may include slices derived from fewer tiers. Like hatching patterns in the pool 250 and in the lower-deck file system 240a indicate the same storage tiers. Thus, the slice 330(1) is derived from the Tier 1 slices 340, the slice 330(2) is derived from the Tier 2 slices 350, and the slices 330(3) and 330(4) are derived from the Tier 3 slices 360.

In example operation, the write request 112a arrives at the upper-deck file system 210a and the upper-deck tiering manager 310 receives the request 112a. In response to receiving the request 112a, the upper-deck tiering manager 310 sends a message 312 to the tiering policy 152 requesting a quality of service specified for the set of information to be written. The upper-deck tiering manager 310 receives a response 314 which provides a data element that designates the specified quality of service. In an example, the upper-deck tiering manager 310 applies the data element (here, 314) as a tag to the write request 112a, which propagates through the IO stack 140 to the lower-deck file system 240a.

In alternative operation, the upper-deck tiering manager 310 checks metadata of the upper-deck file system (UDMD), rather than checking the tiering policy 152, to identify a quality of service to be provided for storing the set of information. For example, the upper-deck tiering manager 310 sends a request 316, to check inodes, indirect blocks, and/or other metadata of the upper-deck files system 210, for a designation of quality of service. Such designation may be received via response 316 and provided as a data element (e.g., as a tag), which is accessible to the lower-deck file system 240a.

In either case, the lower-deck tiering manager 320 receives the request 112a and reads the data element to identify the specified quality of service. In an example, the lower-deck tiering manager 320 checks the slice map 334 to determine whether any slices have been provisioned to the lower-deck file system 240a that meet the specified quality of service, and whether any such slices include enough free blocks to satisfy the write request. If already-provisioned slices of the designated storage tier have a sufficient number of free blocks, the lower-deck file system 240a (acting through the pool manager 150) allocates blocks from the already-provisioned slices derived from devices that meet the designated quality of service (if such blocks have not already been allocated) and stores the set of information specified by the write request 112a in the allocated blocks. Otherwise, the IO stack 140 communicates with the pool manager 150 to provision a new slice from a storage tier that meets the specified quality of service, and allocates blocks from the new slice to store the set of information, or the balance thereof, which did not fit on the already-provisioned slices.

For example, the slice 330(1) is seen to include a free block 332. If the data element specifies a quality of service corresponding to Tier 1, then the pool manager 150 checks the slice map 334 and determines that the slice 330(1) has a free block derived from a Tier 1 slice. The pool manager 150 then allocates the block 332 (if it has not already been allocated), and the lower-deck file system 240a writes the data specified by the write request 112a (e.g., an inode) to the block 332.

To provide another example, the slices 330(3) and 330(4) are seen to include no free blocks. If the data element specifies a quality of service corresponding to Tier 3, then the pool manager 150 checks the slice map 334 and determines that none of the already-provisioned Tier 3 slices (330(3) and 330(4)) have any free blocks. The pool manager 150 then provisions a new Tier 3 slice 330(5) and allocates blocks of the slice 330(5) to satisfy the write request 112. The lower-deck file system 240a then writes the set of information (e.g., file data) specified by the write request 112 to the newly allocated blocks.

Figure 4:
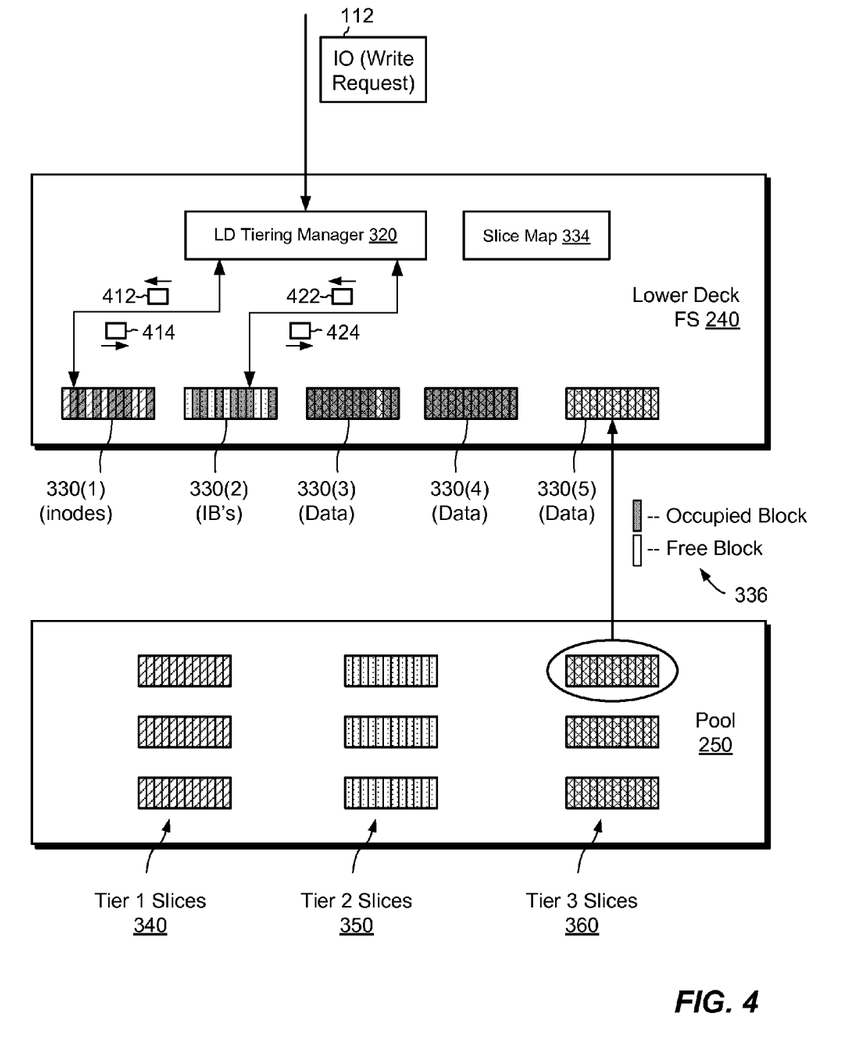
FIG. 4 is a block diagram showing an alternative arrangement, wherein the quality of service for satisfying a write request is obtained from metadata stored in the lower-deck file system.

FIG. 4 shows a more detailed view of an example stack-up of structures of the IO stack 140 for processing a write request 112 in a lower-deck file system 240. The write request 112 represents any of the write requests 112a-c, and thus the example of FIG. 4 pertains to any of data objects 210a-c shown in FIG. 2. Similarly, the lower-deck file system 240 represents any of the lower-deck file systems 240a-c shown in FIG. 2. Here, it is assumed that the write request 112 arrives at the lower-deck tiering manager 320 without any data element having been established for indicating a requested quality of service and that the write request 112 pertains to a particular identified file stored in the lower-deck file system.

The lower-deck tiering manager 320, upon receiving the write request 112, checks metadata for the identified file in the lower-deck file system 240 to obtain a designated quality of service. In one example, the lower-deck tiering manager 320 sends a request 412 to read a field of the file's inode (e.g., from a block of slice 330(1)). The lower-deck tiering manager 320 receives response 414 (a data element) designating the requested quality of service as stored in the inode. The lower-deck file system 240 then proceeds to write the set of information specified by the write request 112 to blocks that meet the designated quality of service, provisioning new slices and/or allocating new blocks as required.

In another example, the lower-deck tiering manager 320 sends a request 422 to read a field of one of the file's indirect blocks (e.g., a block of slice 330(2)). The lower-deck tiering manager 320 receives a response 424 (a data element) designating the requested quality of service as stored in the indirect block. The lower-deck file system 240 then proceeds as described above, to write the set of information specified by the write request 112 to blocks that meet the designated quality of service, provisioning new slices and/or allocating new blocks as required.

Figure 5:
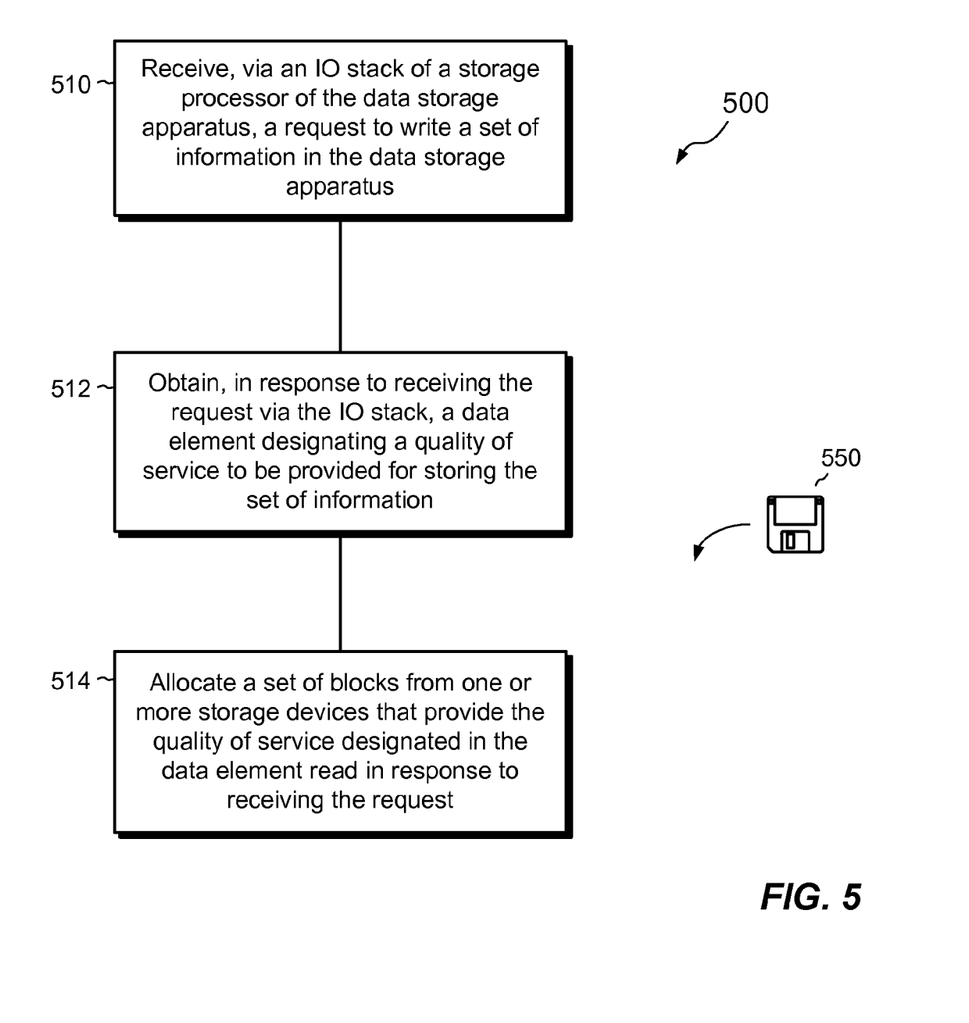
FIG. 5 is a flowchart showing an example process for storing data in different storage tiers of a data storage apparatus, such as is shown in FIG. 1.

FIG. 5 shows an example process 500 for allocating storage to a data storage apparatus. The process 500 is typically carried out by the software constructs, described in connection with FIGS. 1-4, which reside in the memory 130 of the SP 120 and are run by the set of processing units 124. The various acts of the process 500 may be ordered in any suitable way. Accordingly, embodiments may be constructed in which acts are performed in orders different from that illustrated, which may include performing some acts simultaneously, even though the acts are shown as sequential in the illustrated embodiments.

At step 510, a request to write a set of information in the data storage apparatus is received via an IO stack of a storage processor of the data storage apparatus. For example, one of the requests 112(1-N), or a modified version thereof, is received via the IO stack 140. In some examples, the request is received by the upper-deck tiering manager 310 within the IO stack 140, as shown in FIG. 3. In other examples, the request is received by the lower-deck tiering manager 320 within the IO stack 140, as shown in FIGS. 3 and 4. The request may pertain to various data objects. For example, the request may pertain to a file of the upper-deck file system 210a, to a file of the lower-deck file system 240a, to a LUN 210b, to a vVol 210c, or to some other data object. The set of information may pertain to data or to metadata.

At step 512, a data element is obtained in response to receiving the request via the IO stack. The data element designates a quality of service to be provided for storing the set of information. In one example, and as shown in FIG. 3, the upper-deck tiering manager 310 obtains a data element 314 from the tiering policy 152, where the data element 314 designates a quality of service specified by the tiering policy 152. In another example, and as also shown in FIG. 3, the upper-deck tiering manager 310 obtains a data element 318 from upper deck metadata (UDMD), e.g., an inode or indirect block for a file of the upper-deck file system 210a to be written to, where the data element 318 designates a quality of service specified for the particular file or a range thereof. In yet another example, as shown in FIG. 4, the lower-deck tiering manager 320 within the IO stack 140 obtains a data element (e.g., 414 or 424) from lower-deck metadata (e.g., an inode or indirect block) pertaining to a lower-deck file or a range thereof.

At step 514, a set of blocks are allocated from one or more storage devices that provide the quality of service designated in the data element read in response to receiving the request. For example, if a sufficient number of blocks to satisfy the request have not already been allocated to the lower-deck file system 240 from a storage tier providing the designated quality of service, the pool manager 150 allocates blocks to meet the designated quality of service. If the set of information does not fit in already-provisioned slices of the designated quality of service, the pool manager 150 provisions a slice from the pool 250 (e.g., 330(5)) from a storage tier that meets the designated quality of service. The pool manager 150 allocates blocks from the newly provisioned slice, and the lower-deck file system 240a stores the set of information (or balance thereof, which does not fit in the previously-allocated blocks) in the newly allocated blocks.

An improved technique has been described for managing storage tiering in a data storage apparatus, which operates at a fine level of granularity in response to write requests as blocks are allocated for writing. As write requests arrive or are otherwise processed by the data storage apparatus 116, the data storage apparatus 116 identifies a quality of service to be provided for satisfying each write request and allocates a set of blocks from storage devices of storage tiers that provide the identified quality of service. The data storage apparatus may then store the information specified in the write request in the newly allocated blocks.

Having described certain embodiments, numerous alternative embodiments or variations can be made. For example, although it has been described that the IO stack 140 may check the tiering policy 152 or that it may check metadata to obtain a data element specifying a requested quality of service, these approaches and not required to be mutually exclusive and may alternatively be used in combination. For example, information about quality of service may be obtained from multiple sources and combined in any suitable way.

Also, although the disclosed technique hereof relates to inline tiering, nothing prevents this technique from operating in connection with other tiering techniques, including those which operate out of band. For example, it may not always be desirable to apply the same storage tier to snaps as to the primary object being snapped, or to apply the same tiering to blocks created by write-splitting as are applied to the original blocks. To allow for different tiering of snaps and/or split blocks, or other objects, the data storage apparatus 116 may employ an out-of-band tiering process to assign snaps, split blocks, or other objects to different tiers from those assigned to the respective original objects. Such an out-of-band tiering process may operate in the background, independent of the flow of requests arriving from hosts.

Also, it has been shown and described that slices are provisioned to lower-deck file systems in response to write requests. This on-demand approach to provisioning storage is consistent with a thin provisioning model. However, it should be understood that the invention is not limited to thin provisioning and may be used with other provisioning models, which include, for example, thick provisioning, direct provisioning, mapped provisioning, and other provisioning techniques. Also, although the improved technique is shown to involve the use of slices, it is understood that the use of slices is merely an example.

Further, although features are shown and described with reference to particular embodiments hereof, such features may be included and are hereby included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of storing data in different storage tiers of a data storage apparatus, the method comprising:
receiving, via an IO stack of a storage processor of the data storage apparatus, a request to write a set of information in the data storage apparatus;
obtaining, in response to receiving the request via the IO stack, a data element designating a quality of service to be provided for storing the set of information; and
allocating a set of blocks from one or more storage devices of a storage tier that provides the quality of service designated in the data element read in response to receiving the request,
wherein the quality of service designated in the data element is a first quality of service, and wherein the method further comprises:
receiving, via the IO stack of the storage processor of the data storage apparatus, a second request to write a second set of information in the data storage apparatus;
obtaining, in response to receiving the second request via the IO stack, a second data element designating a second quality of service to be provided for storing the second set of information; and
allocating a second set of blocks from one or more storage devices of a second storage tier that provide the second quality of service designated in the second data element read in response to receiving the second request,
wherein the set of information includes file data to be written to a file of a file system, and
wherein the second set of information includes metadata pertaining to the file of the file system,
wherein the request to write the set of information is directed to a file of an upper-deck file system of the data storage apparatus,
wherein the method further comprises mapping the upper-deck file system to a file of an internal, lower-deck file system of the data storage apparatus, the file of the lower-deck file system providing a complete representation of the upper-deck file system and including both data and metadata of the upper-deck file system,
wherein obtaining the data element designating the quality of service to be provided for storing the set of information is performed by a manager of the upper-deck file system,
wherein the method further comprises conveying the data element, via the IO stack, to a manager of the lower-deck file system, the manager of the lower-deck file system thereby receiving the data element via the IO stack, and
wherein allocating the set of blocks is preformed in response to the manager of the lower-deck file system reading the data element received from the manager of the upper-deck file system and applying the data element to select the storage tier that provides the quality of service designated in the data element.

2. The method of claim 1, wherein obtaining the data element includes:
accessing a policy that specifies different qualities of service for different types of information and/or circumstances;
identifying, a quality of service specified by the policy for the set of information and/or current circumstances; and
generating the data element to designate the quality of service specified by the policy.

3. The method of claim 2, wherein the set of information includes data to be written to a file of the upper-deck file system, wherein the policy specifies a quality of service for storing file data, and wherein identifying the quality of service specified by the policy includes identifying the quality of service for storing file data from the policy.

4. The method of claim 2, wherein the set of information includes data to be written to a particular range of a file of the upper-deck file system, wherein the policy specifies a quality of service for file data of the particular range, and wherein identifying the quality of service specified by the policy includes identifying the quality of service specified for the particular range of file data from the policy.

5. The method of claim 2, wherein the set of information includes metadata pertaining to a file of the upper-deck file system, wherein the policy specifies a quality of service for file metadata, and wherein identifying the quality of service specified by the policy includes identifying the quality of service specified for file metadata from the policy.

6. The method of claim 5, wherein the set of information pertains to an inode of the file of the upper-deck file system, wherein the policy specifies a quality of service for inodes, and wherein identifying the quality of service specified by the policy includes identifying the quality of service specified for inodes from the policy.

7. The method of claim 5, wherein the set of information pertains to at least one indirect block of the file of the upper-deck file system, wherein the policy specifies a quality of service for indirect blocks, and wherein identifying the quality of service specified by the policy includes identifying the quality of service specified for indirect blocks from the policy.

8. The method of claim 2, wherein the set of information includes data of a virtual hard disk (VHD) stored in a file of the upper-deck file system, wherein the policy specifies a quality of service for VHD data, and wherein identifying the quality of service specified by the policy includes identifying the quality of service specified for VHD data from the policy.

9. The method of claim 2, wherein the set of information includes data of a virtual memory disk (VMDK) stored in a file of the upper-deck file system, wherein the policy specifies a quality of service for VMDK data, and wherein identifying the quality of service specified by the policy includes identifying the quality of service specified for VMDK data from the policy.

10. The method of claim 1, wherein the request to write the set of information is directed to a file of a file system of the data storage apparatus, and wherein the method further comprises, after reading the data element designating the quality of service to be used for storing the set of information, checking a data structure of the file system to determine whether any free blocks are available to provide the quality of service designated in the data element read from the request.

11. The method of claim 1, wherein the request to write the set of information is directed to a file of a file system of the data storage apparatus, and wherein obtaining the data element designating the quality of service includes accessing metadata for the file stored in the file system to receive a designation of quality of service from the metadata.

12. The method of claim 11, wherein obtaining the data element designating the quality of service includes accessing an inode for the file stored in the file system to receive a designation of quality of service from the inode.

13. The method of claim 11, wherein obtaining the data element designating the quality of service includes accessing an indirect block for the file stored in the file system to receive a designation of quality of service for a particular range of the file from the indirect block.

14. The method of claim 1, wherein obtaining the data element designating the quality of service to be provided for storing the set of information includes, by the manager of the upper-deck file system:
   sending a message to a tiering policy requesting a quality of service to be provided for the set of information;
   in response to the tiering policy receiving the message, receiving the data element from the tiering policy; and
   applying the data element to the request as a tag,
   wherein the request and the applied tag propagate through the IO stack to the manager of the lower-deck file system.

15. The method of claim 1, wherein obtaining the data element designating the quality of service to be provided for storing the set of information includes, by the manager of the upper-deck file system:
   checking metadata of the upper-deck file system to identify a quality of service to be provided for the set of information;
   in response to checking the metadata, receiving the data element; and
   applying the data element to the request as a tag,
   wherein the request and the applied tag propagate through the IO stack to the manager of the lower-deck file system.

16. A data storage apparatus, comprising:
   a storage processor; and
   multiple storage devices, coupled to the storage processor, for storing data of at least one host,
   wherein the storage processor includes a set of processing units coupled to memory, the memory storing executable instructions, which when executed by the set of processing units cause the set of processing units to perform a method of storing data in different storage tiers of the data storage apparatus, wherein the method comprises:
      receiving, via an IO stack of the storage processor of the data storage apparatus, a request to write a set of information in the data storage apparatus;
      obtaining, in response to receiving the request via the IO stack, a data element designating a quality of service to be provided for storing the set of information; and
      allocating a set of blocks from one or more storage devices of a storage tier that provides the quality of service designated in the data element read in response to receiving the request,
      wherein the request to write the set of information is directed to a file of an upper-deck file system of the data storage apparatus, the upper-deck file system mapped to a file in a lower-deck file system of the data storage apparatus, a manager of the upper-deck file system obtaining the data element designating the quality of service, the IO stack conveying the data element to a manager of the lower-deck file system, and wherein allocating the set of blocks is performed in response to the manager of the lower-deck file system applying the data element to select the storage tier that provides the quality of service designated in the data element.

17. The data storage apparatus of claim 16, wherein the file of the lower-deck file system provides a complete representation of the upper-deck file system and includes both data and metadata of the upper-deck file system.

18. The data storage apparatus of claim 16, wherein the quality of service designated in the data element is a first quality of service, and wherein the method further comprises:
   receiving, via the IO stack of the storage processor of the data storage apparatus, a second request to write a second set of information in the data storage apparatus;
   obtaining, in response to receiving the second request via the IO stack, a second data element designating a second quality of service to be provided for storing the second set of information; and
   allocating a second set of blocks from one or more storage devices of a second storage tier that provide the second quality of service designated in the second data element read in response to receiving the second request,
   wherein the set of information includes file data to be written to a file of a file system, and
   wherein the second set of information includes metadata pertaining to the file of the file system.

19. A non-transitory computer readable medium including instructions which, when executed by a set of processing units of a storage processor of a data storage apparatus, cause the set of processing units to perform a method of storing data in different storage tiers of the data storage apparatus, wherein the method comprises:
   receiving, via an IO stack of the storage processor of the data storage apparatus, a request to write a set of information in the data storage apparatus;
   obtaining, in response to receiving the request via the IO stack, a data element designating a quality of service to be provided for storing the set of information; and
   allocating a set of blocks from one or more storage devices of a storage tier that provides the quality of service designated in the data element read in response to receiving the request,
   wherein the request to write the set of information is directed to a file of an upper-deck file system of the data storage apparatus, the upper-deck file system mapped to a file in a lower-deck file system of the data storage apparatus, a manager of the upper-deck file system obtaining the data element designating the quality of service, the IO stack conveying the data element to a manager of the lower-deck file system, and wherein allocating the set of blocks is performed in response to the manager of the lower-deck file system applying the data element to select the storage tier that provides the quality of service designated in the data element.

20. The non-transitory computer readable medium of claim 19, wherein obtaining the data element includes:
   accessing a policy that specifies different qualities of service for different types of information and/or circumstances;
   identifying, a quality of service specified by the policy for the set of information and/or current circumstances; and
   generating the data element to designate the quality of service specified by the policy.

21. The non-transitory computer readable medium of claim 19, wherein the quality of service designated in the data element is a first quality of service, and wherein the method further comprises:

receiving, via the IO stack of the storage processor of the data storage apparatus, a second request to write a second set of information in the data storage apparatus;

obtaining, in response to receiving the second request via the IO stack, a second data element designating a second quality of service to be provided for storing the second set of information; and allocating a second set of blocks from one or more storage devices of a second storage tier that provide the second quality of service designated in the second data element read in response to receiving the second request, wherein the set of information includes file data to be written to a file of a file system, and wherein the second set of information includes metadata pertaining to the file of the file system.

* * * * *